US008588825B2

(12) United States Patent
Jonsson

(10) Patent No.: US 8,588,825 B2
(45) Date of Patent: Nov. 19, 2013

(54) TEXT ENHANCEMENT

(75) Inventor: Håkan Lars Emanuel Jonsson, Hjärup (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 403 days.

(21) Appl. No.: 12/786,702

(22) Filed: May 25, 2010

(65) Prior Publication Data

US 2011/0294525 A1 Dec. 1, 2011

(51) Int. Cl.
*H04W 4/00* (2009.01)

(52) U.S. Cl.
USPC ................................... 455/466; 455/566

(58) Field of Classification Search
USPC .................... 455/466, 566; 709/206
See application file for complete search history.

(56) References Cited

U.S. PATENT DOCUMENTS

| 7,359,688 | B2 * | 4/2008 | Seo et al. ........................ 455/218 |
| 7,360,151 | B1 | 4/2008 | Froloff |
| 2007/0113181 | A1 * | 5/2007 | Blattner et al. ............... 715/706 |
| 2008/0005265 | A1 | 1/2008 | Miettinen |
| 2008/0162648 | A1 * | 7/2008 | Leung ........................... 709/206 |
| 2009/0006565 | A1 | 1/2009 | Velusamy et al. |
| 2009/0055484 | A1 * | 2/2009 | Vuong et al. .................. 709/206 |
| 2009/0144366 | A1 | 6/2009 | Lyle |
| 2010/0054526 | A1 | 3/2010 | Eckles |
| 2010/0088185 | A1 * | 4/2010 | Wen et al. ................... 705/14.72 |
| 2010/0255865 | A1 * | 10/2010 | Karmarkar .................... 455/466 |
| 2010/0306073 | A1 * | 12/2010 | Young ............................. 705/26 |
| 2011/0276327 | A1 * | 11/2011 | Foxenland .................... 704/235 |

FOREIGN PATENT DOCUMENTS

WO 2008004844 A1 1/2008

OTHER PUBLICATIONS

Extended Search Report issued in corresponding EP application No. 11166531.1-2414, dated Aug. 29, 2011.
Extended Search Report issued in corresponding EP application No. 12190229.0, dated Jan. 10, 2013.

* cited by examiner

*Primary Examiner* — Temica M Beamer
(74) *Attorney, Agent, or Firm* — Snyder, Clark, Lesch & Chung, LLP

(57) ABSTRACT

A method including receiving text authored by a user to create a text message; interpreting a meaning of the text; determining a mood of the user; obtaining contextual information, wherein the contextual information comprises at least one of time of day, day of the week, whether it is a holiday, a user location, or a relationship between the user and a recipient of the text message; selecting a classification for the text message based on the meaning of the text, the mood of the user, and the contextual information; displaying text enhancements for the text message from which the user can select, wherein the text enhancements are based on the classification; receiving a user selection for the text enhancements; including the user selected text enhancements with the text message; and sending the text message with the text enhancements to a recipient.

20 Claims, 14 Drawing Sheets

| | CLASS 1 | CLASS 2 | CLASS 3 | CLASS 4 | CLASS 5 | CLASS 6 | ... | CLASS T |
|---|---|---|---|---|---|---|---|---|
| SEMANTICS | | | | | | | | |
| TIME OF DAY | | | | | | | | |
| DAY OF WEEK | | | | | | | | |
| HOLIDAY | | | | | | | | |
| LOCATION OF USER | | | | | | | | |
| MOOD OF USER | | | | | | | | |
| RELATIONSHIP | | | | | | | | |

CLASSIFICATION TABLE 530

Fig. 5B

| | CLASS 1 | CLASS 2 | CLASS 3 | CLASS 4 | CLASS 5 | CLASS 6 | ... | CLASS T |
|---|---|---|---|---|---|---|---|---|
| FONT SIZE | | | | | | | | |
| FONT STYLE | | | | | | | | |
| FONT WEIGHT | | | | | | | | |
| ANIMATION | | | | | | | | |
| IMAGES | | | | | | | | |
| EMOTICONS | | | | | | | | |
| COLOR | | | | | | | | |
| VIBRATION | | | | | | | | |

TEXT ENHANCEMENT TABLE 550

Fig. 5C

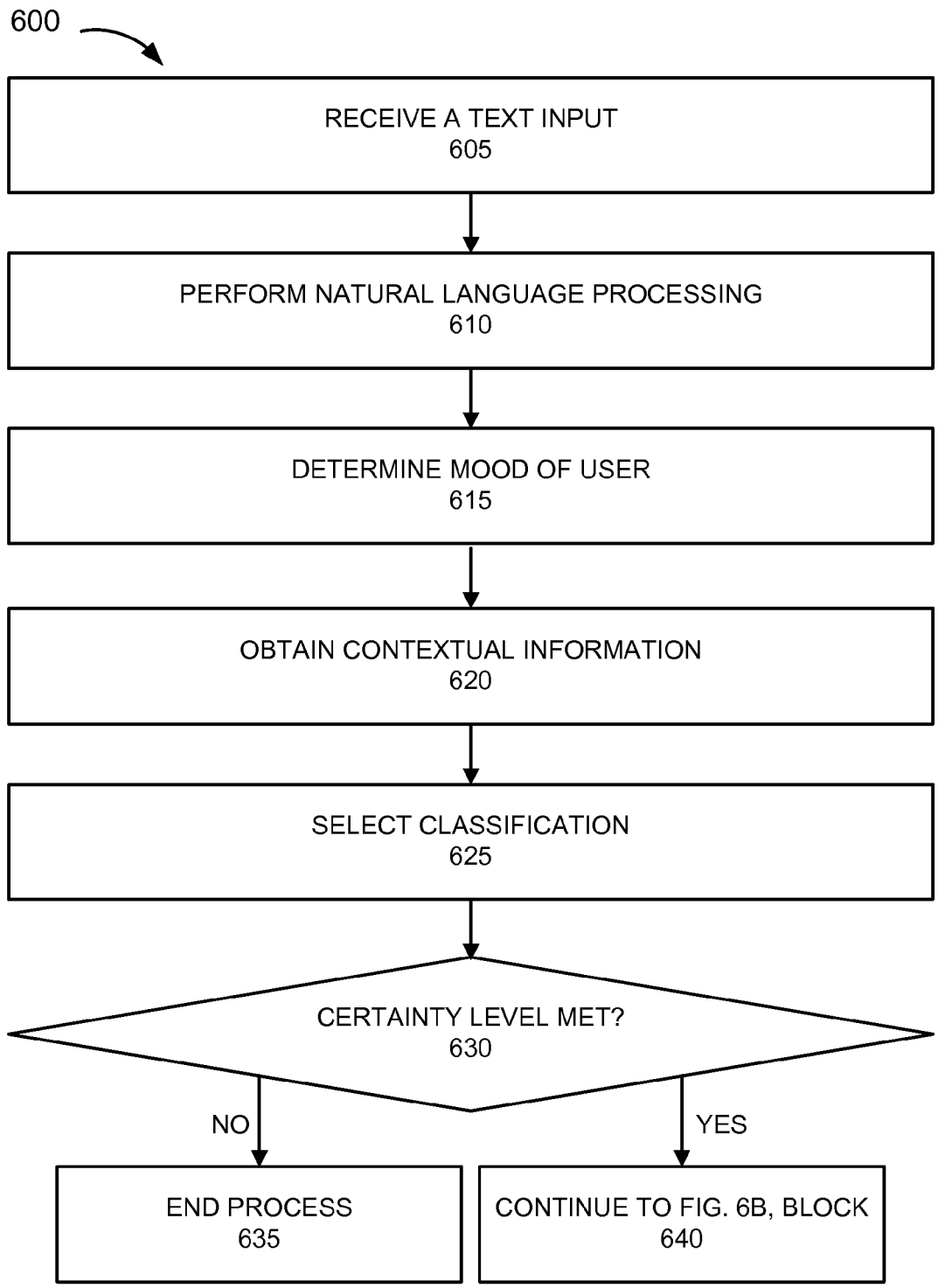

TEXT ENHANCEMENT

BACKGROUND

In recent years, there has been a tremendous upsurge in the use of text messaging as a form of communication. There are a variety of types of text messages, such as, for example, an e-mail message, a short messaging service (SMS) message, a multimedia messaging service (MMS) message, an instant message (IM), or the like.

SUMMARY

According to an exemplary implementation, a method may comprise receiving, by a user device, text authored by a user to create a text message; interpreting a meaning of the text; determining a mood of the user; obtaining contextual information associated with the text message, wherein the contextual information includes relationship information between the user and a recipient of the text message; selecting, by the user device, a classification for the text message based on a least one of the meaning of the text, the mood of the user, or the contextual information; and displaying, by the user device, text enhancements for the text message from which the user can select, wherein the text enhancements are based on the classification.

Additionally, the text enhancements may comprise at least one of a font size, a font weight, a font style, an animation, an image, an emoticon, a color, or a vibrational pattern.

Additionally, the contextual information may further comprise at least one of a user's location, a time of day, a day of a week, or whether it is a holiday. The method may comprise determining a location of the user.

Additionally, the method may further comprise receiving a user selection for the text enhancements; including the selected text enhancements with the text message; and sending the text message with the selected text enhancements to the recipient.

Additionally, the method may further comprise comparing a confidence value associated with the classification to a threshold value; determining that a certainty level is met when the confidence value exceeds the threshold value; and displaying the text enhancements to the user when the confidence value exceeds the threshold value.

Additionally, the method may further comprise adding metadata to the text message, wherein the metadata indicates that the text message includes the text enhancements; and sending the text message with the text enhancements and the metadata to the recipient.

Additionally, the method may further comprise receiving the text message with the text enhancements and the metadata; determining whether the text message includes the metadata; and displaying the text message with the text enhancements when the text message includes the metadata.

Additionally, the method may further comprise determining that the certainty level is not met when the confidence value does not exceed the threshold value; omitting to display the text enhancements to the text message from which the user can select when the certainty level is not met; and sending the text message to the recipient.

Additionally, the method may further comprise receiving a text message; determining whether the received text message includes metadata, wherein the metadata indicates that the received text message includes text enhancements; interpreting a meaning of the received text message when the received text message does not include the metadata; and displaying the text message with text enhancements based on the meaning of the received text message.

According to another implementation, a user device may comprise components configured to receive text authored by a user to create a text message; interpret a meaning of the text; determine a mood of the user; select a classification for the text message based on the meaning of the text and the mood of the user; display text enhancements for the text message from which the user can select, wherein the text enhancements are based on the classification; receive a selection by the user for the text enhancements; include the text enhancements selected by the user with the text message; and send the text message with the text enhancements to a recipient.

Additionally, the user device may comprise a radio telephone.

Additionally, the text message may comprise one of an e-mail, a multimedia messaging service message, or an instant message, and the text enhancements may comprise at least one of a font size, a font weight, a font style, an animation, an image, an emoticon, a color, or a vibrational pattern.

Additionally, the user device may be further configured to obtain a facial expression of the user; determine the mood of the user based on the facial expression; and when selecting a classification, the user device may be further configured to map the mood of the user and the meaning of the text to the classification; and determine whether a confidence value associated with the classification exceeds a threshold value.

Additionally, the user device may be further configured to obtain contextual information associated with the text, wherein the contextual information comprises a one or more of a user location or a relationship between the user and the recipient; and when selecting the classification, the user device may be further configured to select the classification for the text message based on the contextual information.

Additionally, the user device may be further configured to store and manage a mapping between classifications and meanings of text, moods, and contextual information; and store and manage a mapping between classifications and text enhancements.

Additionally, the user device may be further configured to receive a text message; determine whether the received text message includes metadata, wherein the metadata indicates that the received text message includes text enhancements; interpret a meaning of the received text message when the received text message does not include the metadata; display the text message with text enhancements based on the meaning of the received text message.

Additionally, the user device may be further configured to select a classification for the received text message based on the meaning of the received text message; and select text enhancements based on the classification of the received text message.

According to yet another implementation, a computer-readable medium may include instructions executable by at least one processing system. The computer-readable medium may store instructions to receive text authored by a user to create a text message; interpret a meaning of the text; determine a mood of the user; obtain contextual information, wherein the contextual information comprises at least one of time of day, day of the week, whether it is a holiday, a user location, or a relationship between the user and a recipient of the text message; select a classification for the text message based on the meaning of the text, the mood of the user, and the contextual information; display text enhancements for the text message from which the user can select, wherein the text enhancements are based on the classification; receive a user selection for the text enhancements; include the user selected text enhancements with the text message; and send the text message with the text enhancements to the recipient.

Additionally, the computer-readable medium may reside in a user device that comprises a radio telephone.

Additionally, the computer-readable medium may store instructions to access a social network associated with the user; determine the relationship between the user and the recipient based on the accessing; and associate relationship information with a contact entry of a contacts list stored by the user device.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings:

FIG. 5B is a diagram illustrating an exemplary classification table;

FIG. 5C is a diagram illustrating an exemplary text enhancement table;

FIGS. 6A and 6B are flow diagrams illustrating an exemplary process for providing text enhancements at a sending user device.

DETAILED DESCRIPTION

Figure 1A:
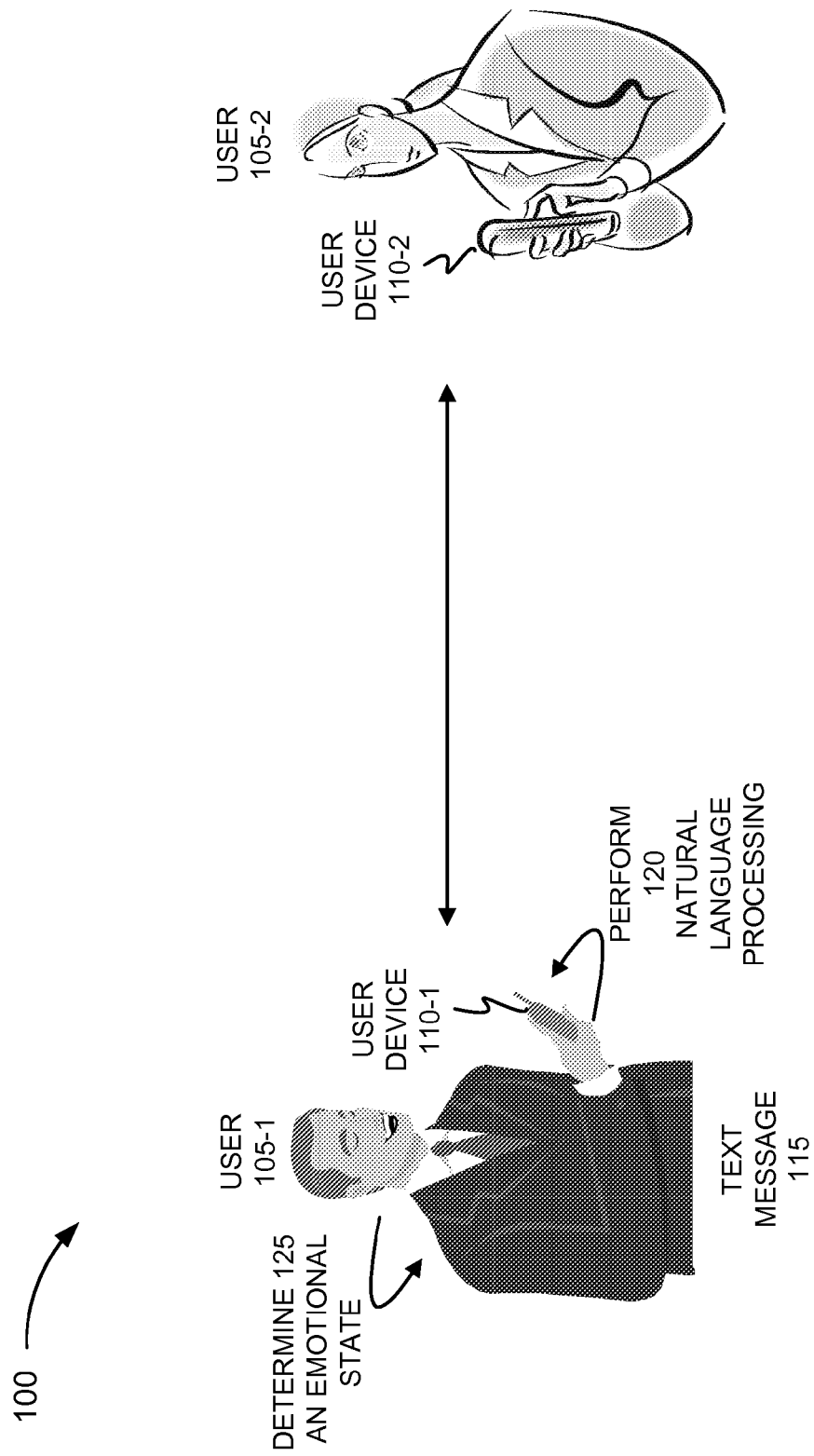
FIGS. 1A-1C are diagrams illustrating an exemplary environment in which an exemplary embodiment for providing text enhancements may be implemented.

The following detailed description refers to the accompanying drawings. The same reference numbers in different drawings may identify the same or similar elements. Also, the following description does not limit the invention, which is defined by the claims.

The term "text message," as used herein, is intended to be broadly interpreted to include a message that includes text. For example, a text message may include an SMS message, an MMS message, or other types of text messages (e.g., e-mail, etc.).

Overview

According to an exemplary embodiment, when a user authors a text message, the text message may be analyzed using natural language processing. For example, the natural language processing may identify subject, verb, object, semantics, etc., associated with the text message. Additionally, contextual information associated with the text message may be obtained. For example, contextual information may include time (e.g., time of day, day of the week, whether it is a holiday, etc.), location of the user, mood of the user, relationship information (e.g., relationship of user to recipient, such as, brother, girlfriend, family member, etc.), etc. According to an exemplary embodiment, the text message may be analyzed to determine a classification for the text message. For example, machine learning classifiers may be used. The text message may be classified based on the information provided from the natural language processing, as well as other types of information, such as, for example, contextual information. The machine learning classifiers may classify a text message as, for example, a happy message, a sad message, a querying message, an informational message, etc.

According to an exemplary embodiment, text enhancements may be proposed to the user based on the classification of the text message. The text enhancements may include, for example, proposed images to include with the text message, proposed font styles, font weights, font sizes, animation, emoticons, or the like. According to an exemplary implementation, the text enhancements may be proposed to the user when a certainty level exceeds a threshold value (i.e., when a measure of assurance exists that the text message is classified correctly, understood correctly, etc.). The user may then select from the proposed text enhancements and send the text message that includes text enhancements. According to an exemplary implementation, metadata may be added to the text message to indicate to, for example, a receiving messaging client that the text message includes text enhancements.

According to an exemplary embodiment, at a receiving end, when the text message is received, it may be determined whether metadata exists to indicate if the text message includes text enhancements. If the text message includes text enhancements (e.g., metadata exists), the receiving user may select whether to accept the text enhancements or not, or the receiving user device may simply display the text message with the text enhancements. On the other hand, if the text message does not include text enhancements (e.g., metadata does not exist), text enhancements may be included with the text message, as described above. However, according to an embodiment, the text enhancements may not be based on user-related information (e.g., mood of the sender, etc.). According to an exemplary implementation, the text enhancements may be included when the certainty level exceeds a threshold value. In such instances, according to an exemplary implementation, the text enhancements may be automatically included with the text message, without providing a selection of text enhancements to the receiving user. Conversely, when the certainty level does not exceed the threshold value, text enhancements may not be included with the text message.

Exemplary Environment

FIG. 1A is a diagram illustrating an exemplary environment 100 in which an exemplary embodiment for providing text enhancement may be implemented. As illustrated in FIG. 1A, environment 100 may include users 105-1 and 105-2 and user devices 110-1 and 110-2 (referred to generally as user device 110 or user devices 110). Environment 100 may include wired and/or wireless connections between user devices 110.

The number of devices and configuration in environment 100 is exemplary and provided for simplicity. In practice, environment 100 may include additional devices, fewer devices, different devices, and/or differently arranged devices than those illustrated in FIG. 1A. For example, environment 100 may include a network to allow users 105-1 and 105-2 to communicate with one another.

User device 110 may correspond to a portable device, a mobile device, a handheld device, or a stationary device. By way of example, user device 110 may comprise a telephone (e.g., a smart phone, a radio telephone, a cellular phone, an Internet Protocol (IP) telephone, etc.), a personal digital assistant (PDA) device, a computer (e.g., a tablet computer, a laptop computer, a palmtop computer, a desktop computer, etc.), and/or some other type of end device. User device 110 may provide text enhancement, as described further below.

Referring to FIG. 1A, according to an exemplary scenario, user 105-1 may wish to author a text message 115 to user 105-2. User 105-1 may open a text messaging client and begin authoring text message 115. As text message 115 is being authored, user device 110-1 may perform 120 natural language processing. The natural language processing may determine, among other things, the semantics or meaning of text message 115. Additionally, according to an exemplary implementation, user device 110-1 may determine 125 an emotional state (e.g., mood) of user 105-1 based on a facial expression of user 105-1 and/or other methods (e.g., galvanic skin response (GSR) methods). Although not illustrated, user device 110-1 may obtain other types of contextual information, such as, for example, the day of the week, the location of user 105-1, the time of day, whether it is a holiday, relationship of recipient (e.g., user 105-2) to user 105-1, etc. For example, user device 110-1 may access social network(s) with which user 105-1 belongs to identify a relationship between user 105-1 and the recipient, may access a contacts list stored on user device 105-1, etc.

Figure 1B:
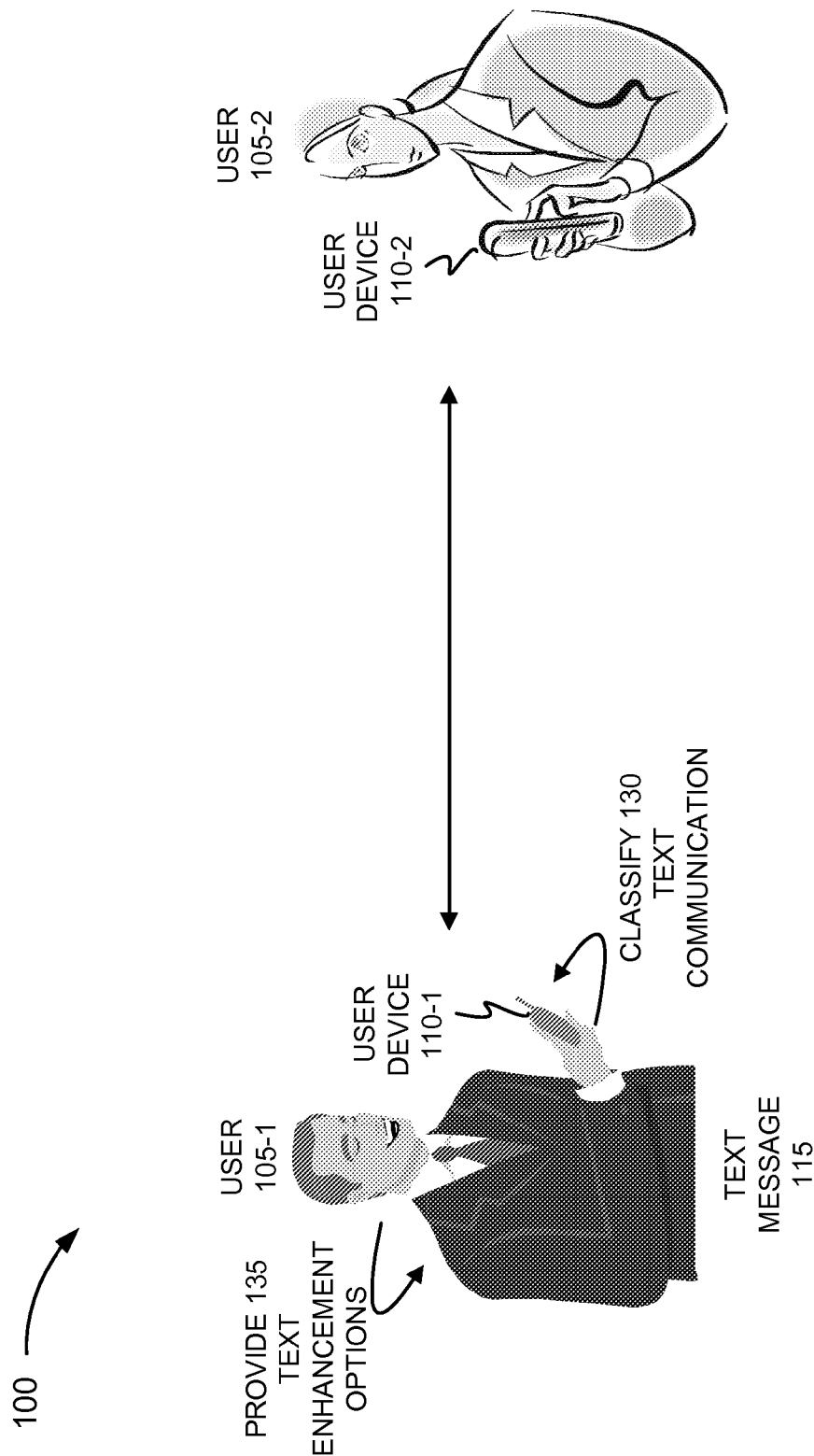
Figure 1C:
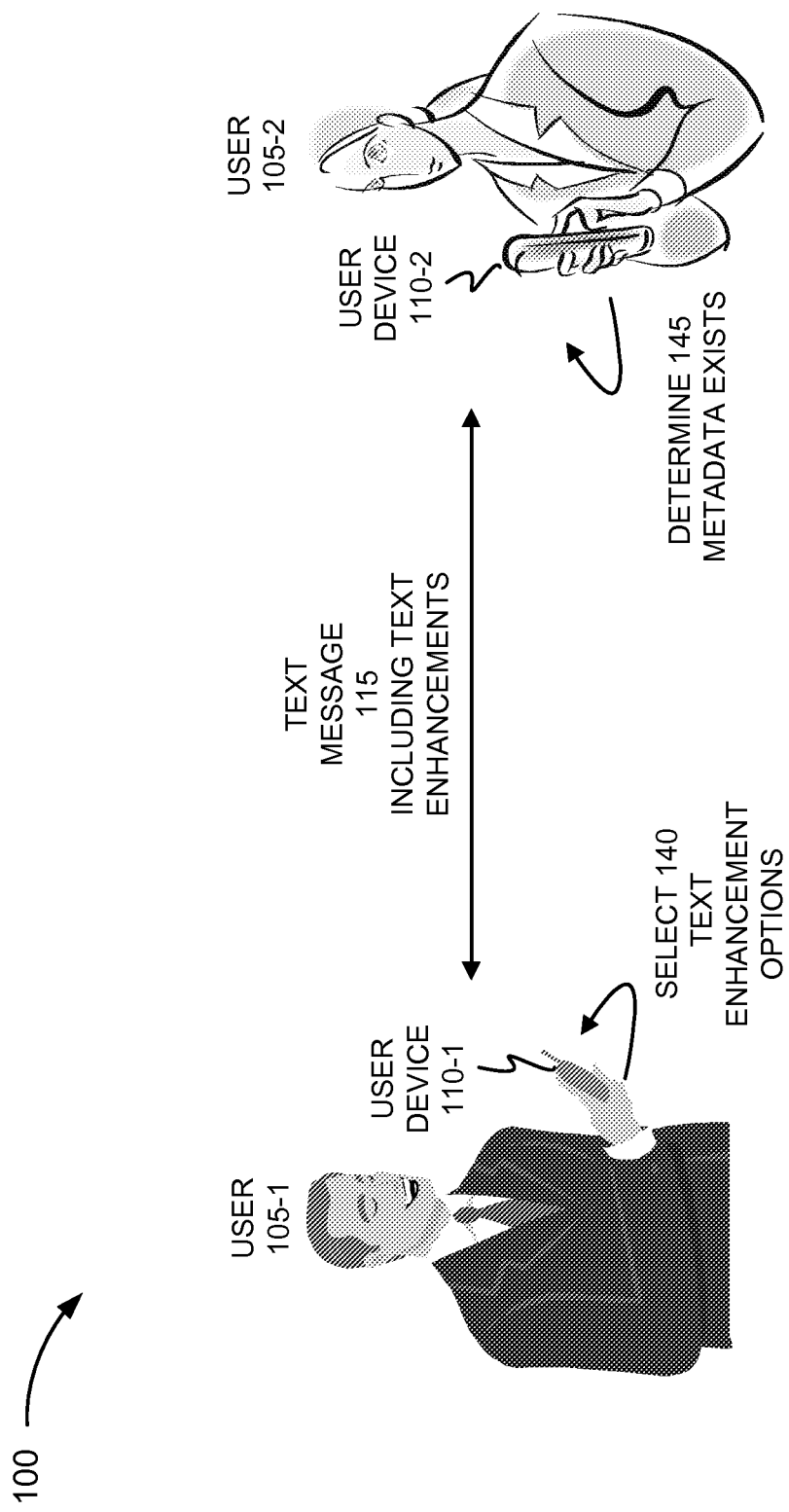

Referring to FIG. 1B, user device 105-1 may classify 130 text message 115. For example, a machine learning classifier component may select a classification for text message 115 based on the natural language processing, the emotional state of user 105-1, and contextual information. In this example, according to an exemplary implementation, user device 110-1 may also determine whether a certainty level associated with the selected classification exceeds a threshold value. In this example, it may be assumed that the certainty level exceeds the threshold value, in which case, as further illustrated, user device 110-1 may provide 135 text enhancements options from which user 105-1 may select. The text enhancement options may include image(s), text font style(s), font weight(s), font size(s), emoticon(s), and/or animation that correspond to the classification. In this example, user 105-1 may select 140 from the text enhancement options presented and send text message 115 to user 105-2, as illustrated in FIG. 1C. User device 110-1 may also include metadata to indicate that text enhancements are included with text message 115. As further illustrated, according to an exemplary embodiment, when text message 115 including text enhancements is received by user device 110-1, user device 110-2 may determine 145 that metadata exists. User device 110-2 may display text message 115 including text enhancements to user 105-2.

Figure 1D:
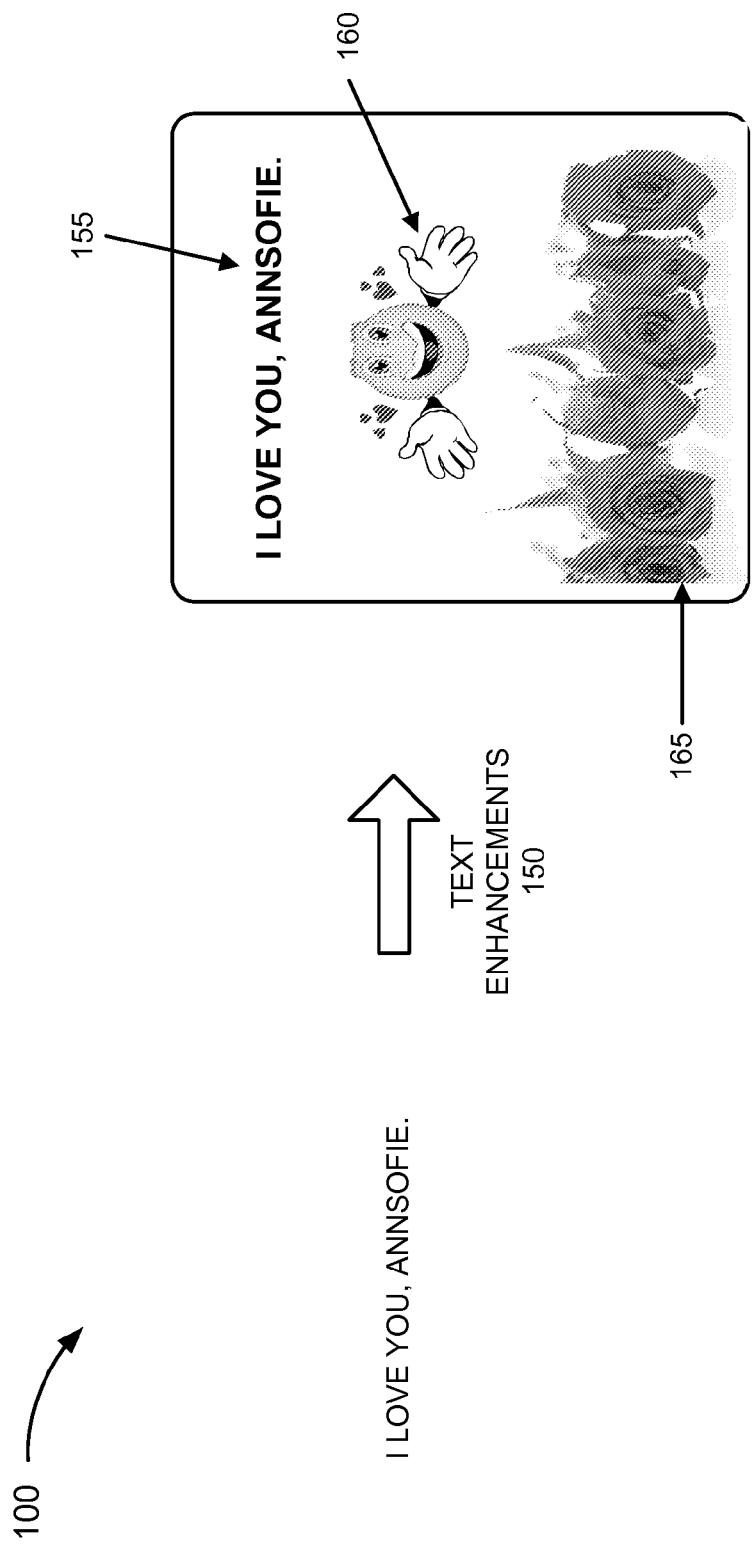
FIG. 1D is a diagram illustrating an exemplary text message that includes text enhancements.

FIG. 1D is a diagram illustrating an exemplary text message 115 that includes text enhancement 150. For example, the original text message authored by user 105-1 may have read "I love you, Annsofie." In this example, user device 110-1 may classify text message 115 as romantic. For example, the natural language processing may determine the semantics of text message 115. User device 110-1 may also evaluate user's 105-1 facial expression (e.g., based an image(s) of user 105-1) and determine that user 105-1 has a happy and/or romantic mood/facial expression. User device 110-1 may also recognize a relationship between user 105-1 and user 105-2. For example, user device 110-1 may store relationship information associated with user's 105-2 contact entry. According to an exemplary embodiment, user device 110-1 may access a social network to which user 105-1 belongs to update contact list entries (e.g., a background process, a user-invoked process, etc.). In this way, user device 110-1 may distinguish between immediate family, friends, business colleagues, etc. In this example, user 105-1 and user 105-2 may be boyfriend and girlfriend. Additionally, user device 110-1 may recognize that it is Valentine's Day. Based on the above, user device 110-1 determines a level of certainty that exceeds a threshold level with respect to a romantic classification. In this example, user device 110-1 was able to distinguish the romantic classification (e.g., when user 105-2 is user's 105-1 girlfriend) versus, for example, a familial love classification (e.g., when user 105-2 is user's 105-1 mother or sister) based on the relationship information.

As illustrated, text enhancements 150 may include a text style, size, and weight 155, an animation 160, and a background image 165. By way of example, text style, size, and weight 155 may include a cursive text style, in bold, with a medium font size. Additionally, animation 160 may include an animation of someone giving a hug. As further illustrated, for example, background image 165 may include a bed of roses.

As a result of the foregoing, a text message may be enhanced. Since an exemplary embodiment of text enhancement has been broadly described, a detailed description that includes variations to the above is described further below.

Exemplary User Device

Figure 2:
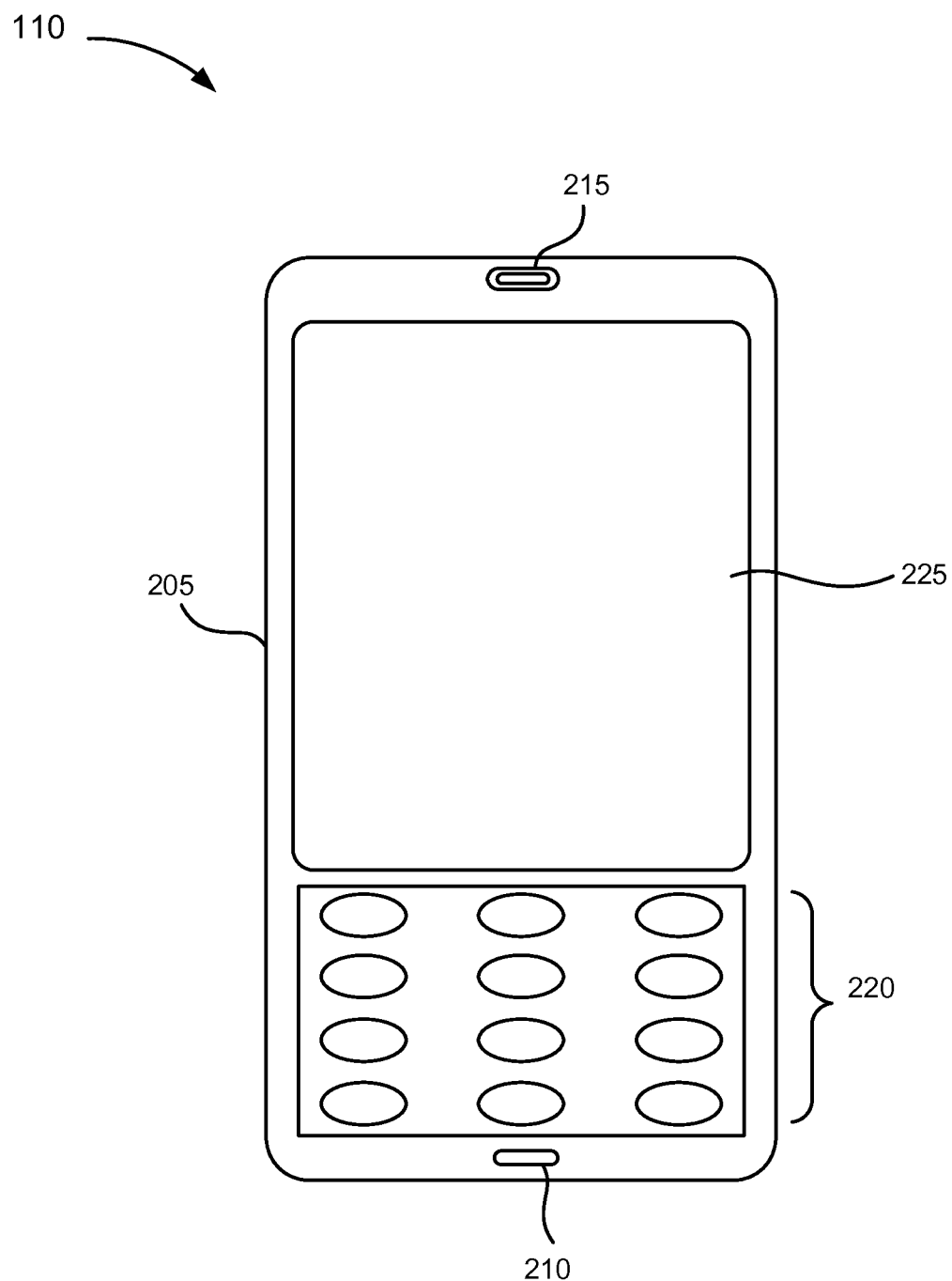
FIG. 2 is a diagram illustrating an exemplary user device in which exemplary embodiments described herein may be implemented.

FIG. 2 is a diagram of an exemplary user device 110 in which exemplary embodiments described herein may be implemented. As illustrated in FIG. 2, user device 110 may comprise a housing 205, a microphone 210, speakers 215, keys 220, and a display 225. According to other embodiments, user device 110 may comprise fewer components, additional components, different components, and/or a different arrangement of components than those illustrated in FIG. 2 and described herein. For example, in some implementations, user device 110 may include a camera. Additionally, user device 110 may take the form of a different configuration (e.g., a slider device, a clamshell device, etc.) than the configuration illustrated in FIG. 2.

Housing 205 may comprise a structure to contain components of user device 110. For example, housing 205 may be formed from plastic, metal, or some other type of material. Housing 205 may support microphone 210, speakers 215, keys 220, and display 225.

Microphone 210 may transduce a sound wave to a corresponding electrical signal. For example, a user may speak into microphone 210 during a telephone call or to execute a voice command. Speakers 215 may transduce an electrical signal to a corresponding sound wave. For example, a user may listen to music or listen to a calling party through speakers 215.

Keys 220 may provide input to user device 110. For example, keys 220 may comprise a standard telephone keypad, a QWERTY keypad, and/or some other type of keypad (e.g., a calculator keypad, a numerical keypad, etc.). Keys 220 may also comprise special purpose keys to provide a particular function (e.g., send, call, e-mail, etc.).

Display 225 may operate as an output component. For example, display 225 may comprise a liquid crystal display (LCD), a plasma display panel (PDP), a field emission display (FED), a thin film transistor (TFT) display, or some other type of display technology.

Additionally, according to an exemplary implementation, display 225 may operate as an input component. For example, display 225 may comprise a touch-sensitive screen. In such instances, display 225 may correspond to a single-point input device (e.g., capable of sensing a single touch) or a multipoint input device (e.g., capable of sensing multiple touches that occur at the same time). Further, display 225 may be implemented using a variety of sensing technologies, including but not limited to, capacitive sensing, surface acoustic wave sensing, resistive sensing, optical sensing, pressure sensing, infrared sensing, or gesture sensing. Display 225 may also comprise an auto-rotating function.

Display 225 may be capable of displaying text, pictures, and/or video. Display 225 may also be capable of displaying various images (e.g., icons, objects, etc.) that may be selected by a user to access various applications, enter data, and/or navigate, etc.

Figure 3:
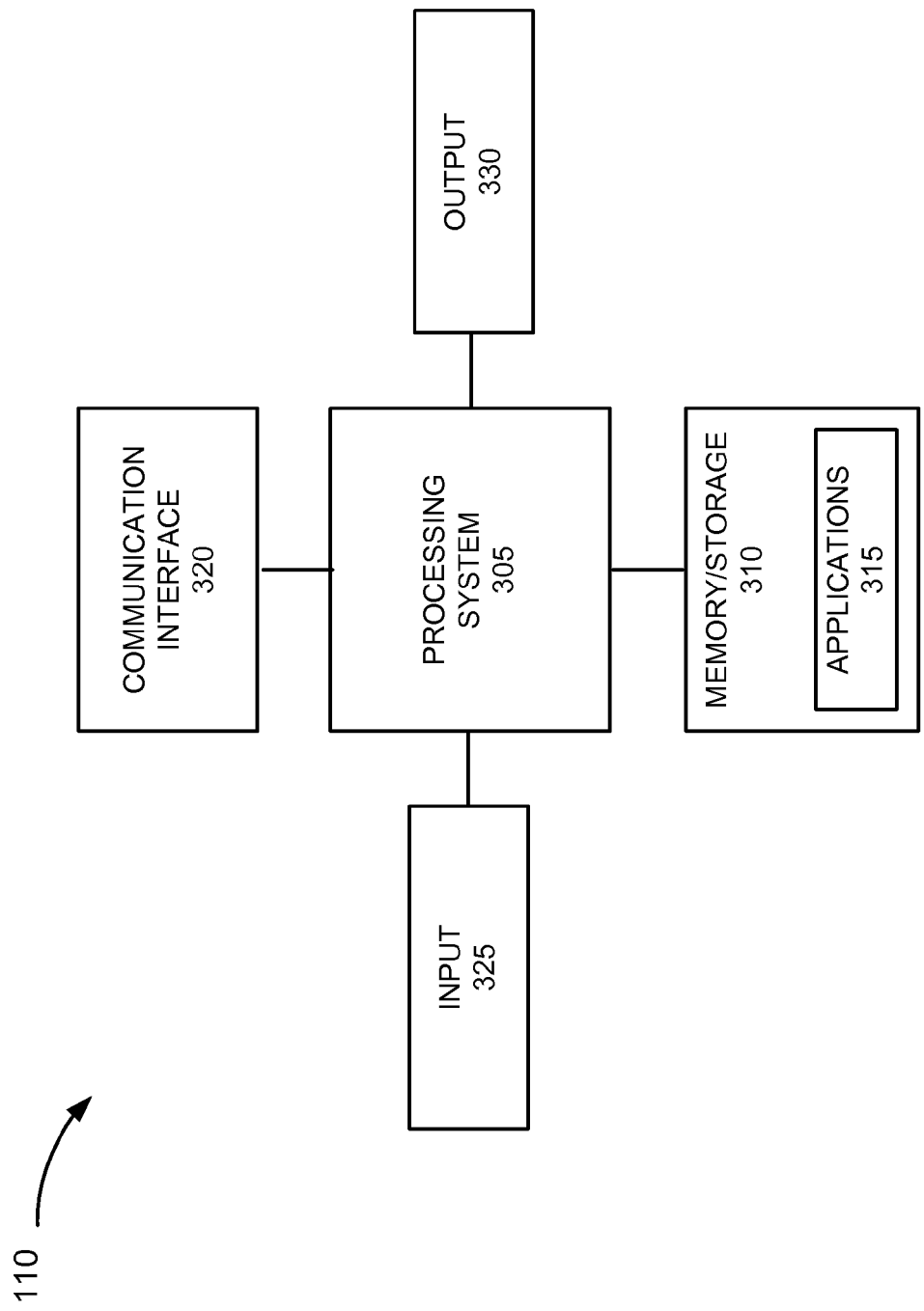
FIG. 3 is a diagram illustrating exemplary components of the user device.

FIG. 3 is a diagram illustrating exemplary components of user device 110. As illustrated, user device 110 may comprise a processing system 305, a memory/storage 310 that may comprise applications 315, a communication interface 320, an input 325, and an output 330. According to other embodiments, user device 110 may comprise fewer components, additional components, different components, or a different arrangement of components than those illustrated in FIG. 3 and described herein.

Processing system 305 may comprise one or multiple processors, microprocessors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 305 may control the overall operation or a portion of operation(s) performed by user device 110. Processing system 305 may perform one or more operations based on an operating system and/or various applications (e.g., applications 315).

Processing system 305 may access instructions from memory/storage 310, from other components of user device 110, and/or from a source external to user device 110 (e.g., a network or another device).

Memory/storage 310 may comprise one or multiple memories and/or one or multiple secondary storages. For example, memory/storage 310 may comprise a random access memory (RAM), a dynamic random access memory (DRAM), a read only memory (ROM), a programmable read only memory (PROM), a flash memory, and/or some other type of memory. Memory/storage 310 may comprise a hard disk (e.g., a magnetic disk, an optical disk, a magneto-optic disk, a solid state disk, etc.) or some other type of computer-readable medium, along with a corresponding drive. Memory/storage 310 may also comprise a memory, a storage device, or storage component that is external to and/or removable from user device 110, such as, for example, a Universal Serial Bus (USB) memory, a dongle, a hard disk, mass storage, off-line storage, etc.

The term "computer-readable medium," as used herein, is intended to be broadly interpreted to comprise, for example, a memory, a secondary storage, a compact disc (CD), a digital versatile disc (DVD), or the like. The computer-readable medium may be implemented in a single device, in multiple devices, in a centralized manner, or in a distributed manner. Memory/storage 310 may store data, application(s), and/or instructions related to the operation of user device 110.

Memory/storage 310 may store data, applications 315, and/or instructions related to the operation of user device 110.

Applications 315 may comprise software that provides various services or functions. By way of example, but not limited thereto, applications 315 may comprise a telephone application, a voice recognition application, a video application, a multi-media application, a music player application, a contacts application, a calendar application, an instant messaging application, a web browsing application, a location-based application (e.g., a Global Positioning System (GPS)-based application, etc.), a blogging application, and/or other types of applications (e.g., a word processing application, a facial expression/recognition application, etc.). Applications 315 may comprise one or more applications for proposing text enhancements, converting a text message to a text message with text enhancements, as well as other processes described in this description in relation to text enhancement.

Communication interface 320 may permit user device 110 to communicate with other devices, networks, and/or systems. For example, communication interface 320 may comprise one or multiple wireless and/or wired communication interfaces. Communication interface 320 may comprise a transmitter, a receiver, and/or a transceiver. Communication interface 320 may operate according to various protocols, communication standards, or the like.

Input 325 may permit an input into user device 110. For example, input 325 may comprise microphone 210, keys 220, display 225, a touchpad, a button, a switch, an input port, voice recognition logic, fingerprint recognition logic, a web cam, and/or some other type of visual, auditory, tactile, etc., input component. Output 330 may permit user device 110 to provide an output. For example, output 330 may comprise speakers 215, display 225, one or more light emitting diodes (LEDs), an output port, a vibratory mechanism, and/or some other type of visual, auditory, tactile, etc., output component.

User device 110 may perform operations in response to processing system 305 executing software instructions contained in a computer-readable medium, such as memory/storage 310. For example, the software instructions may be read into memory/storage 310 from another computer-readable medium or from another device via communication interface 320. The software instructions stored in memory/storage 310 may cause processing system 305 to perform various processes described herein. Alternatively, user device 110 may perform processes based on hardware, hardware and firmware, and/or hardware, software and firmware.

Figure 4:
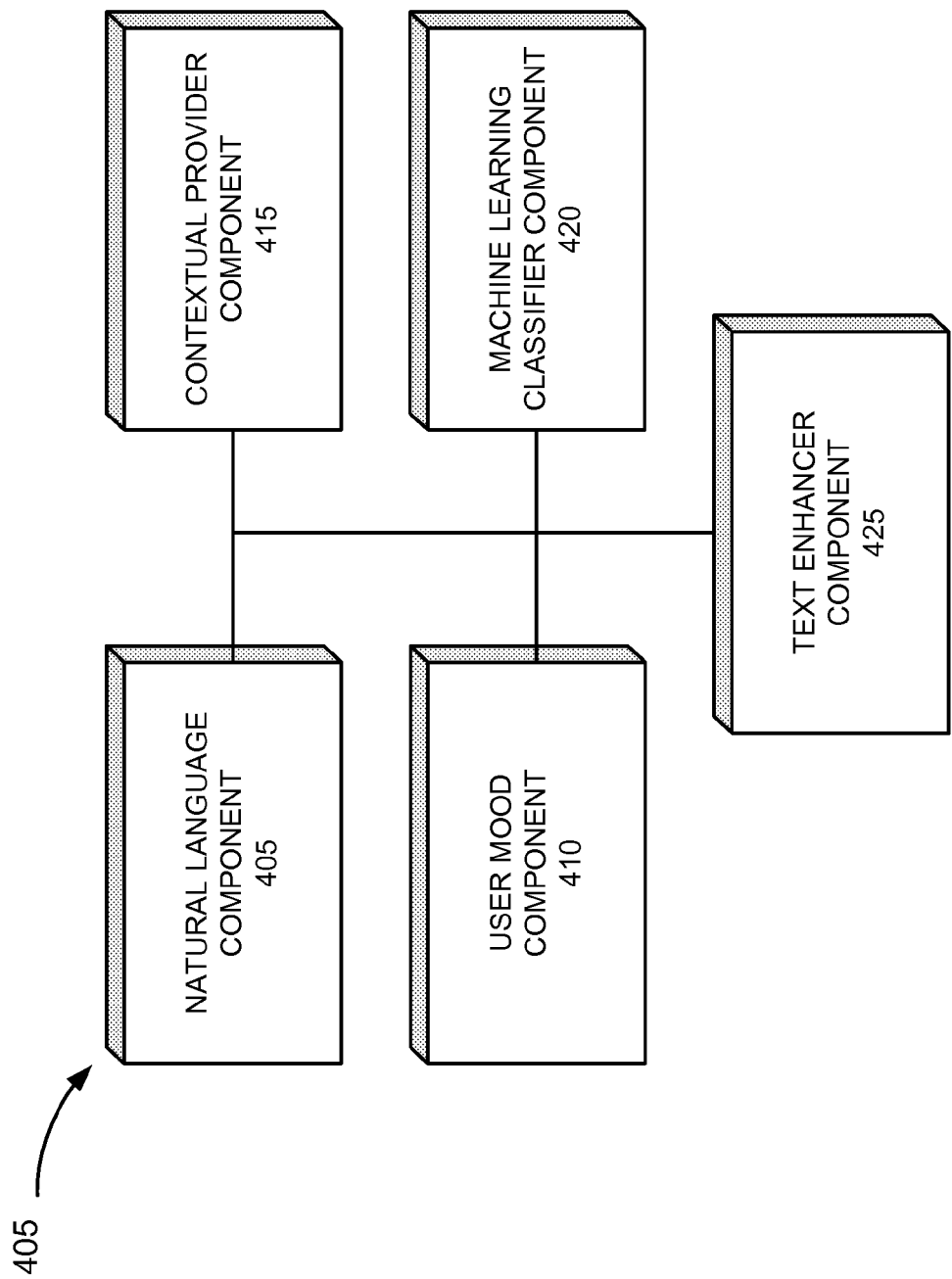
FIG. 4 is a diagram illustrating exemplary functional components of the user device.

FIG. 4 is a diagram illustrating exemplary functional components of user device 110. As illustrated, user device 110 may include a natural language component 405, a user mood component 410, a contextual provider component 415, a machine learning classifier 420, and a text enhancer component 425. Natural language component 405, user mood component 410, contextual provider component 415, machine learning classifier 420, and/or text enhancer component 425 may be implemented as a combination of hardware (e.g., processing system 305, etc.) and software (e.g., applications 315, etc.) based on the components illustrated and described with respect to FIG. 3. Alternatively, natural language component 405, user mood component 410, contextual provider component 415, machine learning classifier 420, and/or text enhancer component 425 may be implemented as hardware, hardware and firmware, or hardware, software, and firmware based on the components illustrated and described with respect to FIG. 3.

Natural language component 405 may perform natural language processing on text. Natural language component 405 may use conventional techniques (e.g., symbolic approaches, statistical approaches, connectionist approaches, machine learning approaches, etc.) to accomplish sentence understanding and extraction of semantics, determine proper parsing, assign parts of speech to each word (e.g., noun, adjective, verb, object, subject, etc.), provide text categorization/classification, etc. Natural language component 405 may evaluate a mood of the user based on the content of a text message.

User mood component 410 may determine a mood of a user. For example, according to exemplary implementation, user device 110 may include an image capturing component (e.g., a camera). User mood component 410 may include a facial expression/recognition component to determine the mood of the user based on an image captured by the image capturing component. Additionally, according to an exemplary implementation, user mood component 410 may include a sensor to obtain GSR responses.

Contextual provider component 415 may provide contextual information associated with text. For example, contextual provider component 415 may determine the user's location using various methods (e.g., GPS, indoor positioning, cell tower location, etc.), determine a time of day, determine a day of week, and/or determine whether it is a holiday (e.g., based on a calendar).

Contextual provider component 415 may determine a relationship between the user and a recipient of the text message. For example, contextual provider component 415 may compare the name of the recipient with the user, which may be stored in a contacts list. Contextual provider component 415 may infer relationships (e.g., immediate family or relative) when last names are the same. Additionally, or alternatively, user device 110 may store other types of profile information (e.g., address information, etc.) that may indicate a relationship between the user and the recipient of the text message. According to another implementation, contextual provider component 415 may access social networks to which the user belongs to determine a relationship between the user and the recipient of the text message. For example, a user may store social network account information (e.g., login information) on user device 110. Contextual provider component 415 may proactively (e.g., periodically, etc.) or reactively access social networks using the social network account information and retrieve/obtain relationship information. According to an exemplary implementation, when contextual provider component 415 retrieves/obtains relationship information, contextual provider component 415 may associate the relationship information (e.g., create a relationship tag, a separate list, etc.) to a contact list entry associated with the recipient. In this way, relationship information may be used to assist in determining a classification for the text message.

Machine learning classifier component 420 may determine a classification for a text message based on classification information provided by natural language component 405, user mood component 410, and/or contextual provider component 415 using conventional methods (e.g., reinforcement learning, adaptive learning, etc). According to an exemplary embodiment, machine learning classifier component 420 may map the classification information provided by natural language component 405, user mood component 410, and/or contextual provider component 415 to one or more classifications. An exemplary implementation for mapping classification information to classifications is described further below.

Machine learning classifier component 420 may also include a confidence value that indicates a certainty level for a determined classification. According to an exemplary implementation, classification information may be assigned a confidence value. For example, semantic information may be assigned a confidence value, a mood of the user may be assigned a confidence value, and a relationship between the user and the recipient may be assigned a confidence value. Other types of classification information, such as, for example, time of day, day of the week, whether it is a holiday, etc., may be assigned a confidence value. However, this type of classification information may be more definitive. According to an exemplary implementation, this type of classification information may be assigned a static confidence value. Additionally, according to another implementation, a confidence value associated with classification information may be assigned based on an interrelationship with other classification information.

Text enhancer component 425 may include text enhancements to a text message based on a determined classification provided by machine learning classifier component 420. For example, text enhancer component 425 may include images, emoticons, animation, color, font style, font size, and/or font weight to the text message based on the determined classification. Text enhancer component 425 may also include other effects (e.g., user device 110 may add vibration, etc.) to enhance the expression of the text message, to indicate a mood of the user, to indicate a context in which the text message is written, etc. An exemplary mapping between classification and text enhancements is described further below. Text enhancer component 425 may compare a confidence value to a threshold value to determine whether a certainty level has been met to permit text enhancement. Text enhancer component 425 may include metadata with a text message, at a sending user device 110, to indicate that text enhancement has been performed. Text enhancement 425 may also recognize, at a receiving user device 110, whether text enhancement has been performed based on the existence of the metadata.

Although FIG. 4 illustrates exemplary functional components of user device 110, in other implementations, user device 110 may include fewer functional components, additional functional components, different functional components, and/or a different arrangement of functional components than those illustrated in FIG. 4 and described. Additionally, or alternatively, one or more operations described as being performed by a particular functional component may be performed by one or more other functional components, in addition to or instead of the particular functional component, and/or one or more functional components may be combined.

Figure 5A:
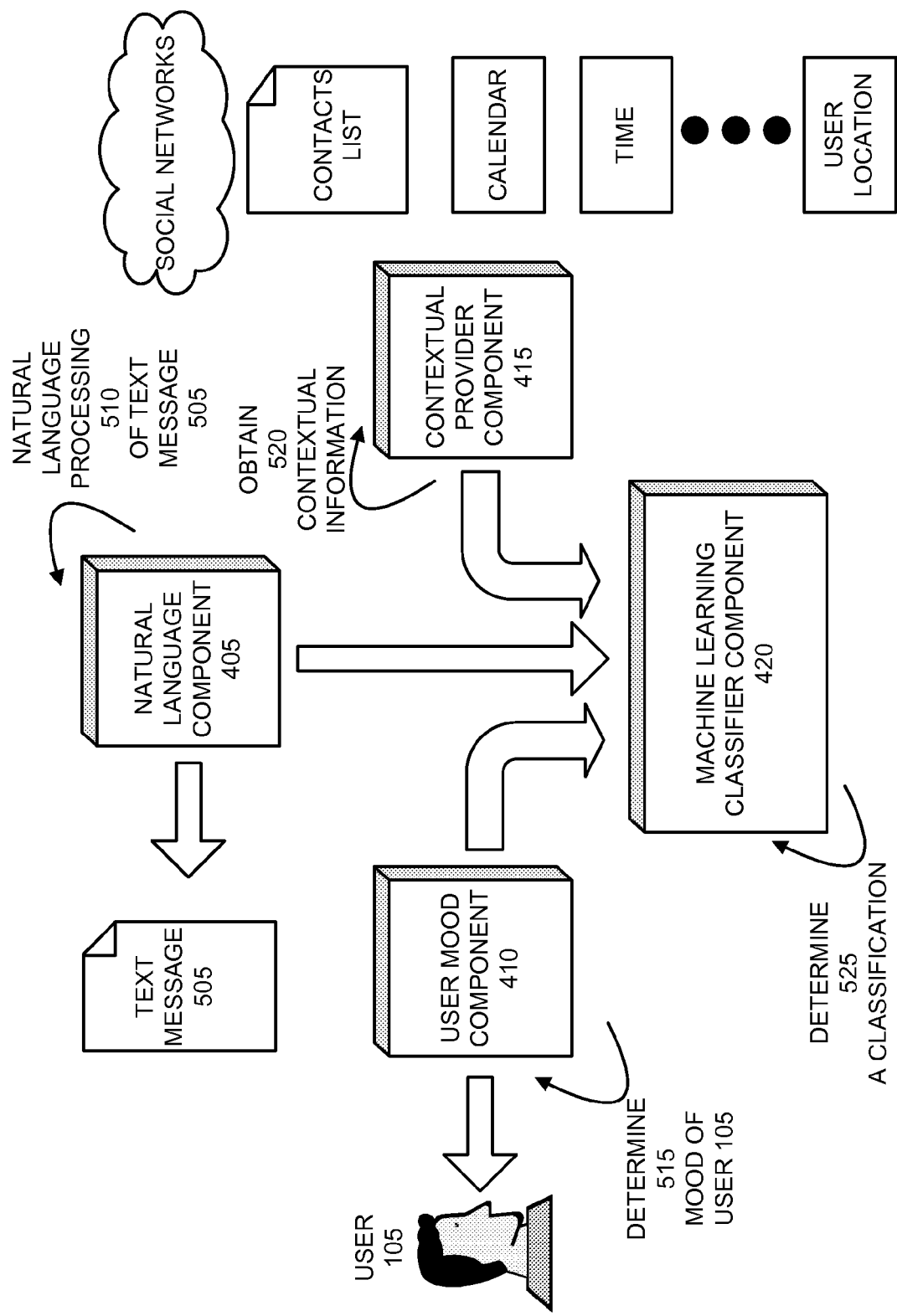
FIG. 5A is a diagram illustrating exemplary processes performed by the functional components described with respect to FIG. 4.

FIG. 5A is a diagram illustrating exemplary processes performed by the functional components described with respect to FIG. 4. As illustrated, natural language component 405 may perform natural language processing 510 of a text message 505, user mood component 410 may determine 515 a mood of user 105, and contextual provider component 415 may obtain 520 contextual information (e.g., relationship information, time of day, user location, etc.). Machine learning component 420 may receive this classification information and determine 525 a classification for text message 505.

FIG. 5B is a diagram illustrating an exemplary classification table 530. According to an exemplary implementation, machine learning component 420 may use classification table 530 to map classification information to one or more classifications. In this example, classification table 530 may include classification information, such as, semantic information (e.g., meaning of the text message), time of day information, day of week information, holiday information, user location information, user mood information, and relationship information. According to other implementations, classification table 530 may include additional classification information, fewer classification information, and/or different classification information.

Classification table 530 may include different types of classification. For example, one category of classification may relate to the mood of the user (e.g., happy, sad, upset, romantic, humorous, serious, etc.). Classification table 530 may also include other categories of classification, such as, for example, business, personal, casual, formal, informational, querying, emergency, important, urgent, etc. Further, classification table 530 may include combinations thereof (e.g., sad and personal, business and important, etc.). According to an exemplary implementation, machine learning classifier component 420 may manage classification table 530, its informational content, mappings, etc.

According to an exemplary implementation, machine learning classifier component 420 may select a classification based on an aggregate confidence value (e.g., a summation of confidence values associated with the classification information (i.e., mood of the user, relationship of the user, etc.). Additionally, or alternatively, according to another exemplary implementation, machine learning classifier component 420 may use other techniques to select a classification (e.g., prior history of classification selections, statistical analysis, feedback from user, etc.).

FIG. 5C is a diagram illustrating an exemplary text enhancement table 550. According to an exemplary implementation, text enhancer component 425 may use text enhancement table 550 to map classifications to one or more text enhancements. In this example, text enhancements may include font size, font style, font weight, animation, images emoticons, color, and vibration. According to other implementations, text enhancement table 550 may include additional text enhancements, fewer text enhancements, and/or different text enhancements.

As previously described, according to an exemplary embodiment, text enhancer component 425 may determine whether a certainty level has been met before text enhancement is recommended for a text message. According to an exemplary implementation, text enhancer component 425 may compare a confidence value (e.g., an aggregate confidence value) to a threshold value to determine whether a certainty level has been met to permit text enhancement. According to another implementation, text enhancer component 425 may user other techniques (e.g., statistical analysis, prior history, etc.) to determine whether a certainty level has been met, with respect to the selected classification, before text enhancement is included with the text message.

According to an exemplary embodiment, user device 110 may store various font sizes, font styles, font weights, animations, images (e.g., pictures, icons, etc.), emoticons, colors (e.g., colors for text, colors to be used as a background, etc.) that may be mapped to one or more classifications. User device 110 may also store various vibrational patterns to indicate an emotional state of the user or other attribute associated with the text message and/or classification information. According to an exemplary implementation, when text enhancer component 425 determines that the certainty level has been met, text enhancer component 425 may present text enhancements (e.g., via a graphical user interface) to the user based on the determined classification. The user may then select the text enhancements the user would like to include with the text message. Additionally, in instances when text enhancer component 425 determines that the certainty level has not been met, text enhancer component 425 may not present a selection of text enhancements to the user, unless requested by the user.

Figure 6B:
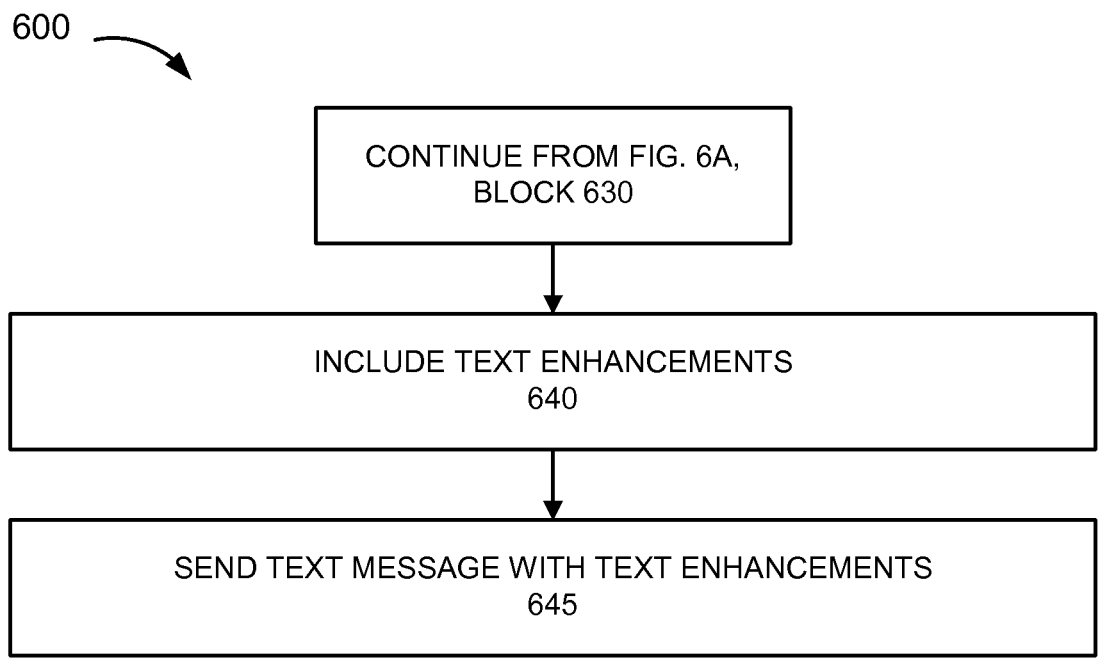

FIGS. 6A and 6B are flow diagrams illustrating an exemplary process 600 for providing text enhancement. According to an exemplary embodiment, process 600 may be performed by user device 110 (e.g., a sending user device 110 of a text message). According to another exemplary embodiment, process 600 may be performed by a combination of devices (e.g., user device 110 and a server). For example, one or more operations of process 600 may be performed by a server. By way of example, natural language processing may be performed by a server and the meaning of the text message may be provided to user device 110.

Process 600 may include receiving a text input (block 605). For example, a user may enter a text message that is received by user device 110 via keys 220. The text message may correspond to an email, an SMS message, an MMS message, an IM, or the like.

Natural language processing may be performed (block 610). For example, as previously described, natural language component 405 of user device 110 may perform natural language processing on the text message. Natural language component 405 may determine the meaning of the text message.

A mood of the user may be determined (block 615). For example, as previously described, user mood component 410 may determine a mood of the user.

Contextual information may be obtained (block 620). For example, as previously described, contextual provider component 415 of user device 110 may obtain contextual information. For example, the contextual information may include the user's location, time of day, day of week, whether it is a holiday, and/or a relationship between the user and a recipient of the text message.

A classification may be selected (block 625). For example, as previously described, machine learning classifier component 420 of user device 110 may select a classification for the text message. According to an exemplary embodiment, machine learning classifier component 420 may map the meaning of the text message, the mood of the user, and contextual information to one or more classifications. For example, according to an exemplary implementation, machine learning classifier component 420 may use classification table 530. According to an exemplary implementation, machine learning classifier component 420 may select a classification based on an aggregate confidence value. According to other implementations, machine learning classifier component 420 may use other techniques to select a classification (e.g., prior history of selections, statistical analysis, etc.).

It may be determined whether a certainty level is met (block 630). As previously described, text enhancer component 425 may determine whether a certainty level has been met. For example, according to an exemplary implementation, text enhancer component 425 may compare the aggregate confidence value to a threshold value to determine whether a certainty level has been met. According to other implementations, text enhancer component 425 may use other techniques, as previously described.

If it is determined that the certainty level is not met (block 630-NO), process 600 may end (block 635). For example, as previously described, text enhancer component 425 may not present a selection of text enhancements to the user that corresponds to the selected classification.

If it is determined that the certainty level is met (block 630-YES), text enhancements may be included (block 640), as illustrated in FIG. 6B. For example, as previously described, text enhancer component 425 may present a selection of text enhancements to the user that corresponds to the selected classification. According to an exemplary embodiment, text enhancer component 425 may use text enhancement table 550 to provide the user with selections of text enhancements. The user may select from one or more of the text enhancements. Text enhancer component 425 may include the selected text enhancements with the text message.

A text message that includes text enhancements may be sent (block 645). For example, as previously described, user device 110 may send the text message that includes text enhancements to the recipient. Additionally, according to an exemplary implementation, user device 110 may include metadata to the text message to indicate to, for example, a receiving messaging client, that the text message includes text enhancements.

Although FIGS. 6A and 6B illustrate an exemplary process 600, in other implementations, process 600 may include additional operations, fewer operations, and/or different operations than those illustrated and described with respect to FIGS. 6A and 6B.

In addition, while a series of blocks has been described with regard to process 600, the order of the blocks may be modified in other implementations. Further, non-dependent blocks may be performed in parallel.

Figure 7A:
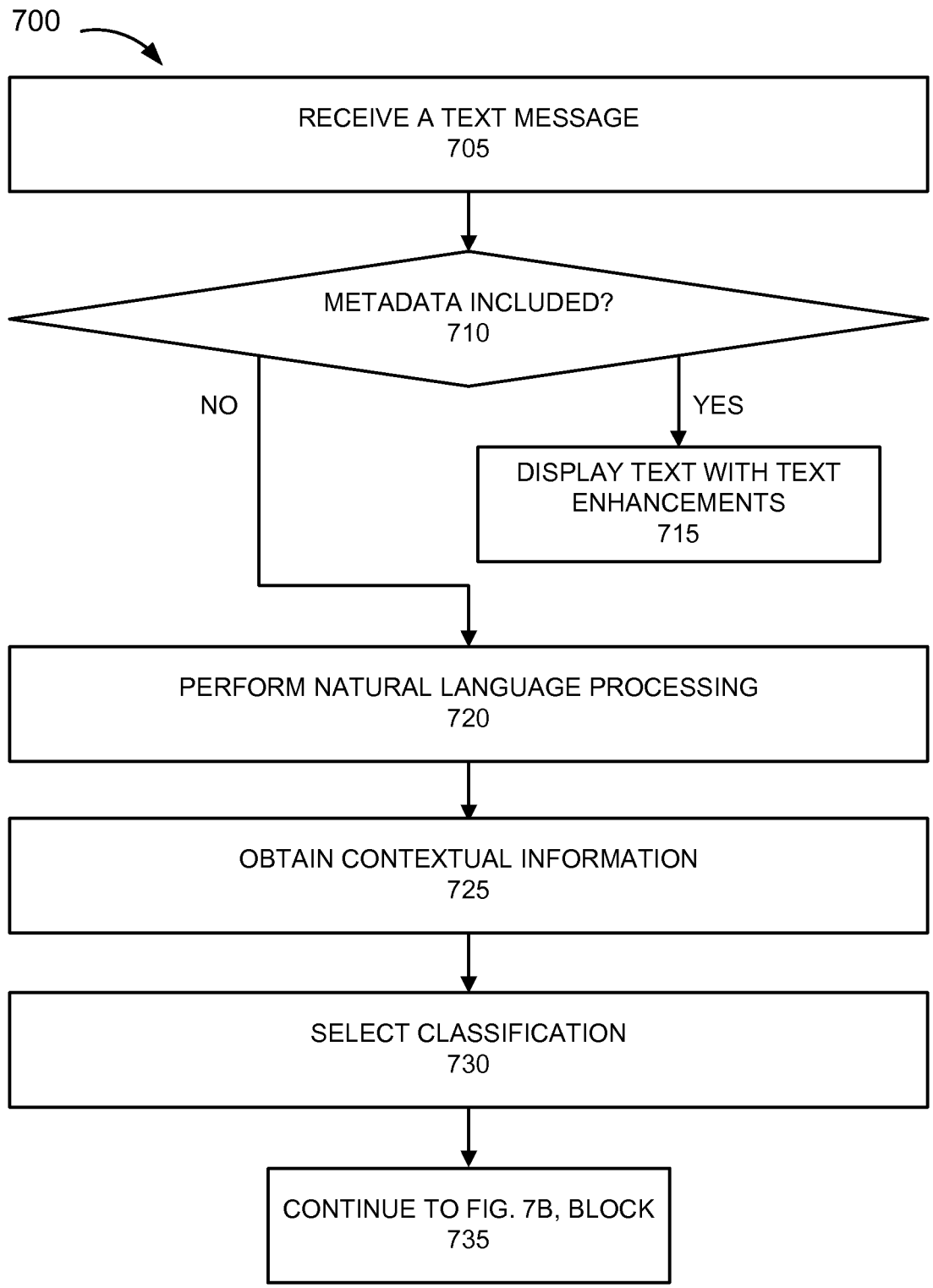
FIGS. 7A and 7B are diagrams illustrating an exemplary process for providing text enhancements at a receiving user device.
Figure 7B:
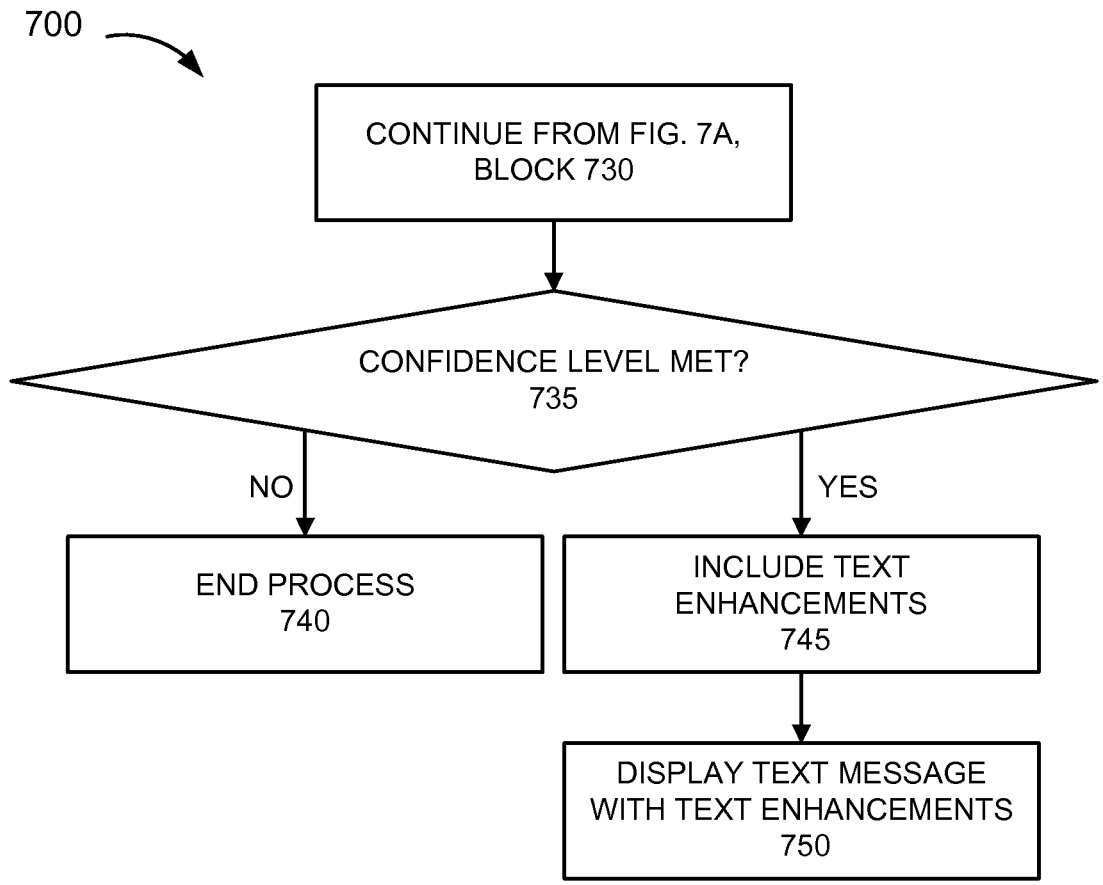

FIGS. 7A and 7B are flow diagrams illustrating an exemplary process 700 for providing text enhancements. According to an exemplary embodiment, process 700 may be performed by user device 110 (e.g., a receiving user device 110 of a text message). According to another exemplary embodiment, process 700 may be performed by a combination of devices (e.g., user device 110 and a server). For example, one or more operations of process 700 may be performed by a server. By way of example, natural language processing may be performed by a server and the meaning of the text message may be provided to user device 110.

A text message may be received (block 705). For example, as previously described, user device 110 may receive a text message from another user device 110. The other user device 110 may have text enhancement capabilities or may not have text enhancement capabilities.

It may be determined whether metadata exists (block 710). For example, as previously described, user device 110 may determine whether metadata exists indicating that the text message includes text enhancements. If it is determined that metadata exists (block 710-YES), the text message including the text enhancements may be displayed (block 715). For example, user device 110 may display the text message that includes the text enhancements. If it is determined that metadata does not exist (block 710-NO), natural language processing may be performed (block 720). For example, as previously described, natural language component 405 of user device 110 may perform natural language processing on the text message. Natural language component 405 may determine the meaning of the text message.

Contextual information may be obtained (block 725). For example, as previously described, contextual provider component 415 of user device 110 may obtain contextual information. For example, the contextual information may include the time of day, day of week, whether it is a holiday, and/or a relationship between the user and the sender of the text message.

A classification may be selected (block 730). For example, as previously described, machine learning classifier component 420 of user device 110 may select a classification for the text message. According to an exemplary embodiment, machine learning classifier component 420 may map the meaning of the text message and contextual information to one or more classifications. For example, according to an exemplary implementation, machine learning classifier component 420 may use classification table 530. According to an exemplary implementation, machine learning classifier component 420 may select a classification based on an aggregate confidence value. According to other implementations, machine learning classifier component 420 may use other techniques to select a classification (e.g., prior history of selections, statistical analysis, etc.).

Referring to FIG. 7B, it may be determined whether a certainty level is met (block 735). As previously described, text enhancer component 425 may determine whether a certainty level has been met. For example, according to an exemplary implementation, text enhancer component 425 may compare the aggregate confidence value to a threshold value to determine whether a certainty level has been met. According to other implementations, text enhancer component 425 may use other techniques, as previously described.

If it is determined that the certainty level is not met (block 735-NO), process 700 may end (block 740). For example, as previously described, text enhancer component 425 may not include text enhancements with the text message.

If it is determined that the certainty level is met (block 735-YES), text enhancements may be included (block 745). For example, as previously described, text enhancer component 425 may select text enhancements that correspond to the selected classification. Text enhancer component 425 may include the selected text enhancements with the text message. Text with text enhancements may be displayed (block 750). For example, user device 110 may display the text message that includes the text enhancements to the user.

Although FIGS. 7A and 7B illustrate an exemplary process 700, in other implementations, process 700 may include additional operations, fewer operations, and/or different operations than those illustrated and described with respect to FIGS. 7A and 7B.

In addition, while a series of blocks has been described with regard to process 700, the order of the blocks may be modified in other implementations. Further, non-dependent blocks may be performed in parallel.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

The terms "comprise," "comprises," "comprising," as well as synonyms thereof (e.g., include, etc.), when used in the specification is taken to specify the presence of stated features, integers, steps, or components but does not preclude the presence or addition of one or more other features, integers, steps, components, or groups thereof. In other words, these terms mean inclusion without limitation.

The article "a," "an," and "the" are intended to mean one or more items. Further, the phrase "based on" is intended to mean "based, at least in part, on" unless explicitly stated otherwise. The term "and/or" is intended to mean any and all combinations of one or more of the listed items.

Further certain features described above may be implemented as a "component" or logic that performs one or more functions. This component or logic may include hardware, such as processing system 305 (e.g., one or more processors, one or more microprocessors, one or more ASICs, one or more FPGAs, etc.), a combination of hardware and software (e.g., applications 315), a combination of hardware, software, and firmware, or a combination of hardware and firmware.

No element, act, or instruction used in the present application should be construed as critical or essential to the implementations described herein unless explicitly described as such.

What is claimed is:

1. A method comprising:
receiving, by a user device, text authored by a user to create a text message;
interpreting a meaning of the text;
determining a mood of the user;
obtaining contextual information associated with the text message, wherein the contextual information includes social relationship information between the user and a recipient of the text message;
selecting, by the user device, a classification for the text message based on a least one of the meaning of the text, the mood of the user, or the contextual information;
comparing a confidence value associated with the classification to a threshold value;
determining that a certainty level is met when the confidence value exceeds the threshold value; and
displaying, by the user device, text enhancements for the text message from which the user can select when the confidence value exceeds the threshold value, wherein the text enhancements are based on the classification.

2. The method of claim 1, wherein the text enhancements comprise at least one of a font size, a font weight, a font style, an animation, an image, an emoticon, a color, or a vibrational pattern.

3. The method of claim 1, wherein the contextual information further comprises at least one of a user's location, a time of day, a day of a week, or whether it is a holiday, and the method comprising:
determining a location of the user.

4. The method of claim 1, further comprising:
receiving a user selection for the text enhancements;
including the selected text enhancements with the text message; and
sending the text message with the selected text enhancements to the recipient.

5. The method of claim 1, further comprising:
assigning a confidence value to the mood of the user.

6. The method of claim 1, further comprising:
adding metadata to the text message, wherein the metadata indicates that the text message includes the text enhancements; and
sending the text message with the text enhancements and the metadata to the recipient.

7. The method of claim 6, further comprising:
receiving the text message with the text enhancements and the metadata;
determining whether the text message includes the metadata; and
displaying the text message with the text enhancements when the text message includes the metadata.

8. The method of claim 1, further comprising:
determining that the certainty level is not met when the confidence value does not exceed the threshold value;
omitting to display the text enhancements to the text message from which the user can select when the certainty level is not met; and
sending the text message to the recipient.

9. The method of claim 1, further comprising:
receiving a text message;
determining whether the received text message includes metadata, wherein the metadata indicates that the received text message includes text enhancements;
interpreting a meaning of the received text message when the received text message does not include the metadata; and
displaying the text message with text enhancements based on the meaning of the received text message.

10. A user device comprising:
a display;
a communication interface;
a memory to store instructions; and
a processor to execute the instructions to:
receive text authored by a user to create a text message;
interpret a meaning of the text;
obtain a facial expression of the user;
determine a mood of the user based on the facial expression of the user;
select a classification for the text message based on the meaning of the text and the mood of the user, wherein a selection of the classification includes to:
map the mood of the user and the meaning of the text to the classification; and
determine whether a confidence value associated with the classification exceeds a threshold value;
display, via the display, text enhancements for the text message from which the user can select, wherein the text enhancements are based on the classification;
receive a selection by the user for the text enhancements;
include the text enhancements selected by the user with the text message; and
send, via the communication interface, the text message with the text enhancements to a recipient.

11. The user device of claim 10, wherein the user device comprises a radio telephone.

12. The user device of claim 10, wherein the text message comprises one of an e-mail, a multimedia messaging service message, or an instant message, and the text enhancements comprise at least one of a font size, a font weight, a font style, an animation, an image, an emoticon, a color, or a vibrational pattern.

13. The user device of claim 10, wherein the instructions comprise instructions to:
assign a confidence value to the mood of the user; and
select the classification based on a prior history of classification selections.

14. The user device of claim 10, wherein the instructions comprise instructions to:
obtain contextual information associated with the text, wherein the contextual information comprises one or more of a user location or a social relationship between the user and the recipient; and when selecting the classification, the instructions comprise instructions to:
select the classification for the text message based on the contextual information.

15. The user device of claim 14, wherein the instructions comprise instructions to:
store and manage a mapping between classifications and meanings of text, moods, and contextual information; and
store and manage a mapping between classifications and text enhancements.

16. The user device of claim 10, wherein the instructions comprise instructions to:
receive, via the communication interface, a text message;
determine whether the received text message includes metadata, wherein the metadata indicates that the received text message includes text enhancements;
interpret a meaning of the received text message when the received text message does not include the metadata;
display, via the display, the text message with text enhancements based on the meaning of the received text message.

17. The user device of claim 16, wherein the instructions comprise instructions to:
- select a classification for the received text message based on the meaning of the received text message; and
- select text enhancements based on the classification of the received text message.

18. A computer-readable medium containing instructions executable by at least one processing system, the computer-readable medium storing instructions to:
- receive text authored by a user to create a text message;
- interpret a meaning of the text;
- obtain a facial expression of the user;
- determine a mood of the user based on the facial expression of the user;
- obtain contextual information, wherein the contextual information comprises at least one of time of day, day of the week, whether it is a holiday, a user location, or a social relationship between the user and a recipient of the text message;
- select a classification for the text message based on the meaning of the text, the mood of the user, and the contextual information;
- determine whether a confidence value associated with the classification exceeds a threshold value;
- display text enhancements for the text message from which the user can select, wherein the text enhancements are based on the classification;
- receive a user selection for the text enhancements;
- include the user selected text enhancements with the text message; and
- send the text message with the text enhancements to the recipient.

19. The computer-readable medium of claim 18, wherein the computer-readable medium resides in a user device comprising a radio telephone, and the computer-readable medium further storing one or more instructions to:
- assign a confidence value to the mood of the user; and
- select the classification based on a prior history of classification selections.

20. The computer-readable medium of claim 18, when obtaining the social relationship between the user and the recipient, the computer-readable medium further storing one or more instructions to:
- access a social network associated with the user;
- determine the social relationship between the user and the recipient based on the accessing; and
- associate social relationship information with a contact entry of a contacts list stored by the user device.

* * * * *

UNITED STATES PATENT AND TRADEMARK OFFICE
CERTIFICATE OF CORRECTION

| | | |
|---|---|---|
| PATENT NO. | : 8,588,825 B2 | Page 1 of 1 |
| APPLICATION NO. | : 12/786702 | |
| DATED | : November 19, 2013 | |
| INVENTOR(S) | : Jonsson | |

It is certified that error appears in the above-identified patent and that said Letters Patent is hereby corrected as shown below:

In the Claims:

At column 15, line 13, change the term "a least one" to "at least one".

Signed and Sealed this
Twenty-fifth Day of March, 2014

Michelle K. Lee
*Deputy Director of the United States Patent and Trademark Office*